US007007198B2

(12) United States Patent
Boling

(10) Patent No.: US 7,007,198 B2
(45) Date of Patent: Feb. 28, 2006

(54) METHOD FOR HANDLING EXCEPTIONS OF APPLICATIONS

(75) Inventor: Eli Boling, Manchester, MA (US)

(73) Assignee: Borland Software Corporation, Scotts Valley, CA (US)

(*) Notice: Subject to any disclaimer, the term of this patent is extended or adjusted under 35 U.S.C. 154(b) by 504 days.

(21) Appl. No.: 10/198,836

(22) Filed: Jul. 18, 2002

(65) Prior Publication Data

US 2003/0023905 A1    Jan. 30, 2003

Related U.S. Application Data

(60) Provisional application No. 60/306,335, filed on Jul. 18, 2001.

(51) Int. Cl.
*G06F 11/00* (2006.01)
(52) U.S. Cl. .............................. 714/15; 714/17; 714/38
(58) Field of Classification Search .................. 714/15, 714/17, 19, 38
See application file for complete search history.

(56) References Cited

U.S. PATENT DOCUMENTS 5,630,047 A * 5/1997 Wang .......................... 714/15
6,009,258 A * 12/1999 Elliott ......................... 703/22
6,044,475 A * 3/2000 Chung et al. ................. 714/15

* cited by examiner

Primary Examiner—Robert Beausoliel
Assistant Examiner—Timothy M. Bonura
(74) Attorney, Agent, or Firm—Darby & Darby

(57) ABSTRACT

An exception handling system and method for PC-mapped systems. A support library containing language-independent functions is used to raise exceptions. These functions then use language-dependent callback functions to make inquiries about the stack frames built by the language-dependent code, and to further make callbacks to language-dependent functions to clean up those stack frames. The support library works its way up the function call stack from where an exception was issued, searching for function frames that are interested in the exception. An unwind phase is begun when a function frame that is interested in the exception is found. In the unwind phase, the unwinder attempts to unwind the stack up to the interested frame, restoring callee-saved register values, and other pertinent processor-specific information, such as the stack pointer, and frame register. The unwinder then transfers control to the handler code specified by the interested function. The search and unwind phases locate all the information required to tear apart the stack frames laid down at the time the exception is raised. This unwind information is recorded in a compact format. Additionally, no relocations are required in the unwind information. As a result, overall performance of applications at startup time is improved over known PC-mapped exception handling schemes.

5 Claims, 3 Drawing Sheets

```
raise <expression>
```

FIG. 1

```
(a)
try
      <statements>
except
   <exception case statements>
end;

(b)
try
   <statements>
except
   on E: TMyException do
   begin
      <exception case statements>
   end;
end;

(c)
try
   <statements>
finally
   <cleanup statements>
end;
```

FIG. 2

```
(a)
function f(a: integer) : integer;
   begin
result := a + G(a);
end;

(b)
push    eax
call    G
@@label1:
pop     edx
add     eax, edx
ret
```

FIG. 3

```
procedure F;
begin
try
G;
except
on E: Exception
begin
   Writeln(E.Message);
end;
   end;
```

FIG. 4

```
asm
SUB    ESP, EAX
CALL   G
   end;
```

FIG. 5

METHOD FOR HANDLING EXCEPTIONS OF APPLICATIONS

This application claims the priority of U.S. Provisional Application No. 60/306,335, filed on Jul. 18, 2001 which is hereby incorporated by reference in its entirety.

FIELD OF THE INVENTION

The present invention relates to systems and methods related to the processing of exceptions that may occur in the execution of computer software.

BACKGROUND INFORMATION

In the early 1990s, Borland introduced Delphi, an application development environment for the Windows operating system (OS). More recently, Borland introduced Kylix, bringing the Delphi toolset and environment to the Linux OS. As with Delphi, Object Pascal is at the heart of Kylix. Consequently, bringing Delphi to Linux required porting Object Pascal and all of its language features. One of the most challenging features to port involves exception handling.

In a language that supports exception handling, error conditions are raised (or "thrown") as "exceptions," which are propagated dynamically, as opposed to being passively returned as error results from functions. The method of propagation varies from system to system. Exceptions are an integral part of the implementation of Delphi and play an important role as a means of error recovery.

Object Pascal features a nonresumptive exception-handling model designed to be efficient enough to be used as the basis of error handling for a variety of applications. The syntax of exception handling is straightforward and the semantics are kept in control because the language is comparatively well designed, and exceptions are restricted in two ways: 1) the object must be thrown by reference; i.e., the object has to be created on the heap, and a reference (pointer) to that object is what is thrown; and 2) the object must be derived from the Object Pascal built-in type TObject.

In Object Pascal, there are two ways of raising a language exception and three ways of catching exceptions. As illustrated in FIG. 1 (where the value of <expression> must be a class instance derived from TObject), the first method of raising an exception is straightforward. The second method of raising an exception, however, is somewhat more complex and is described below.

The three forms used to catch exceptions have different semantics and usage. The first and simplest is try/except; as illustrated in FIG. 2(a). The try part of a try/except statement specifies the start of a block of one or more statements to be protected. The except part specifies the start of a block of one or more statements to be executed in the event an exception occurs while executing the statements in the try part. Within the except part, users can elect to use the second method of raising an exception, which is simply using raise without any expression following it. This causes the current exception to be re-raised from the current execution point, thereby allowing final error handling and disposition of the exception to be determined elsewhere.

A second form for catching exceptions uses the more specialized form of try/except, try/except/on, illustrated in FIG. 2(b). The statements in the except block only execute if the exception being raised is of the type TMyException, or derived therefrom. In this case, the programmer can define types of exception objects. The type of the object describes the type of exception. Consider a type named TbadDateValue and that some piece of code was processing a date value and found that it was not valid in a particular context. It would then raise an exception of the type TbadDateValue. except blocks that handle only those types of exceptions would encode the name of the type and would only be executed if an exception of that type passed their way. If the except block is executed, the variable E is bound to the exception object for the duration of the exception block. As mentioned, in Object Pascal, when an exception is raised, an object is created on the heap, and that is what is actually raised. In order to be able to use that object, the programmer has to be able to have a name to reference it within the program, so the syntax allows for declaring a variable (e.g. "E") to be bound to that exception object for any particular exception clause in the program.

The third form for handling exceptions is the more specialized try/finally, illustrated in FIG. 2(c). try/finally differs from the other forms of exception handling statements in that the statements in the finally clause are always executed, even if no exception is thrown while executing the try block. This is useful for writing cleanup code that must always be executed for a function, to free resources, or to bring data structures back to sanity from a partial dissection.

The Delphi implementation of exception handling is relatively simple because Windows has a built-in mechanism for dispatching and unwinding exceptions. Delphi implements exception support via a stack-based chain of exception handlers, threaded through a global, per-thread list that is accessible by both the operating system and the client application.

A stack frame is an area of the stack memory allocated for a function invocation. The stack frame of a function contains the activation record for the function. When a function is called, the caller typically pushes some arguments onto the stack. The function being called then commonly allocates additional space on the stack to use as scratch space during its operation. When the function returns, that space, and the space used by pushing the parameters is returned to the stack. In an Intel x86 environment, a function establishes a stack frame using the frame pointer register (EBP) of the CPU. This operation, however, has added expense, and occupies the EBP register which could otherwise be used as a scratch register by the optimizer.

When unwinding an exception, the object is to properly free up those allocations made by all the functions in the call sequence that is currently live. For instance, given functions A, B and C, if A calls B, and B calls C, and C raises an exception to be caught by A, then the stack frames for both C and B have to be cleaned up; i.e., their space de-allocated, and the stack pointer returned to the location it was when A called B.

There are several advantages to the Windows scheme. First, all functions, including the operating system, use the same method for dispatching exceptions when hardware exceptions such as access violations occur. This enables nearly seamless behavior in the implementation of support for hardware exceptions, as opposed to language exceptions. Moreover, the global list of handlers, threaded through the FS segment, makes it efficient to dispatch exceptions. Stack unwinding is also easy because the records on the stack contain the information needed to reset the stack and frame pointers to the proper offsets for a given function in the event of exceptions. There is no need to inspect activation records of functions that do not have exception-handling constructs. Finally, the run-time installation of handlers laid out on the stack makes it easy for any language to participate in exception handling, including assembler code.

A significant disadvantage of the Windows scheme is the impact on performance of the non-exception case. Any function that contains exception-handling constructs must install a frame on the stack and thread the entry onto the per-thread list of handlers, even if no exception is raised during the execution of the function. By their nature, exceptions should be uncommon and not the normal case during the average execution of a function body. Therefore, the installation of the exception frame is a burden on the normal execution thread of most functions. This impact is most significant in the case of frequently called, small functions.

An additional disadvantage is the impact that the installation of the exception frame has on the optimizer. The compiler is hampered by the need to install this handler in the optimization of many functions, most notably small functions.

The Linux method for dealing with exceptions is radically different from that for Windows. For instance, there is no OS-defined mechanism for dispatching and unwinding exceptions. Language vendors are on their own with respect to how to deal with exceptions. On the Linux platform, most vendors use a program counter (PC)-mapped exception handling scheme. In a PC-mapped scheme, the compiler and linker work together to emit a static map of address ranges for functions, for blocks of code that are wrapped with exception handlers, and for their handlers. In addition, the compiler generates static data describing each function's stack layout to allow a run-time system to unwind the stack past an invocation of a given function. An external run-time library is provided by the language implementation to handle the dispatching and unwinding of exceptions.

The run-time library unwinds an exception by capturing the address from which the exception is raised, then looking-up the address in the PC map to identify the function from which the exception came. The run-time library thereby gains access to the per-function descriptors about the stack layout, and to the per-function ranges of potential handlers in the function for the exception. The stack layout descriptors are used to unwind the stack to the next caller, if need be, while the ranges of potential handlers are used to evaluate whether this function had any protected code that needs to have its exception handlers called in the unwind process.

The PC-mapped scheme described above has several significant advantages over the Windows scheme. First, there is no impact on the non-exception case because all the data that is emitted for dealing with exceptions is purely static data. Additionally, the absence of run-time stack frames for exceptions tends to make the optimizer's job easier for dealing with exception handling.

The disadvantages of the PC-mapped implementation are numerous, though they are mostly restricted to the language implementations. In some cases, they can be mitigated through standardization.

First, a PC-mapped scheme requires a more sophisticated and thus complex compiler. The compiler front- and back-ends require significant interaction to be able to emit the data required by the run-time library for unwinding stack frames. The linker is also implicated. Care must be taken to ensure that the static data generated by the compiler is position-independent, or prohibitive load-time hits can occur due to the relocation of exception-only data at application startup. Also, stack unwinding is much slower, because the static information for functions must be found and interpreted in order to unwind function frames, even for functions that do not contain exception-handling constructs.

Exception handling based on PC maps thus has the drawback that it adds to the runtime image of an application. For purposes of efficiency, it is necessary that such maps be small. Known implementations of PC-mapped exception handling currently available for Intel x86 architectures rely on more portable information for describing how to unwind function frames when propagating an exception up the call stack. This more portable information specifies the locations for registers that have been stored on the stack that have to be restored when a frame is unwound. It also specifies how to unwind the stack in esoteric cases of function frame layout. One choice for the format of this unwind information is a subset of the debug information format known as DWARF. A part of the DWARF specification provides a processor-neutral way of describing the location of various processor registers that have been saved on the stack during a function invocation. While portable, this information is bulky and can thus cause the size of applications to increase greatly. The GNU C++ compiler and the products based on it are typical of the state of the art.

SUMMARY OF THE INVENTION

In an exemplary embodiment of an exception handling scheme of the present invention, a support library is used to raise exceptions. The support library preferably contains language-independent functions that are called to raise exceptions. These functions then use language-dependent callback functions to make inquiries about the stack frames built by the language-dependent code, and to further make callbacks to language-dependent functions to clean up those stack frames.

This support library, or "unwinder," works its way up the function call stack from where the exception was issued, searching for function frames that are interested in the exception. A function frame may be interested in an exception because it wishes to catch the exception and perform error handling, or it has language-specific cleanup work to perform, such as releasing resources that the frame held before the frame goes away when it is unwound past.

When the unwinder finds a frame for a function that is interested in the exception, it then begins an unwind phase. In the unwind phase, the unwinder attempts to unwind the stack up to the interested frame, restoring callee-saved register values, and other pertinent processor-specific information, such as the stack pointer, and frame register. The unwinder then transfers control to the handler code specified by the interested function.

The unwinder's search and unwind phases must be able to locate all the information required to tear apart the stack frames laid down at the time the exception is raised. An aspect of the present invention relates to the format of this information and how it is used in these phases. In an exemplary embodiment, the present invention reduces the overall size of the stack frame unwind information. Additionally, the present invention ensures that no relocations are required in the unwind information. These features translate into a smaller overall image size, since the size of the image increases substantially linearly according to the number and size of functions in the image. A further advantage is that the lack of relocation information results in better application load time performance in some operating systems, such as Linux, which apply all relocations at load time. Applications, or more notably, shared objects (e.g. DLLs), that have unwind information generated in a linear relation to the number and size of relocations can also benefit from the present invention.

The present invention can be used in a variety of systems and configurations, including as part of a software application release on an Intel x86 architecture using exception handling with a PC-mapped exception handling scheme or the like. It improves the overall performance of the application at startup time by limiting relocations and working set size implications at application load time, thereby reducing the time required for application to start up.

BRIEF DESCRIPTION OF THE DRAWINGS

FIG. 1 illustrates an exemplary method of raising an exception.

FIGS. 2(a) through 2(c) illustrate three exemplary forms for catching exceptions.

FIG. 3(a) illustrates an exemplary function f and FIG. 3(b) shows exemplary pseudo code generated to carry out the function f.

FIG. 4 illustrates an exemplary procedure in connection with the unwinding of a stack frame.

FIG. 5 illustrates a further exemplary procedure in connection with the unwinding of a stack frame.

DETAILED DESCRIPTION

Figure 6:
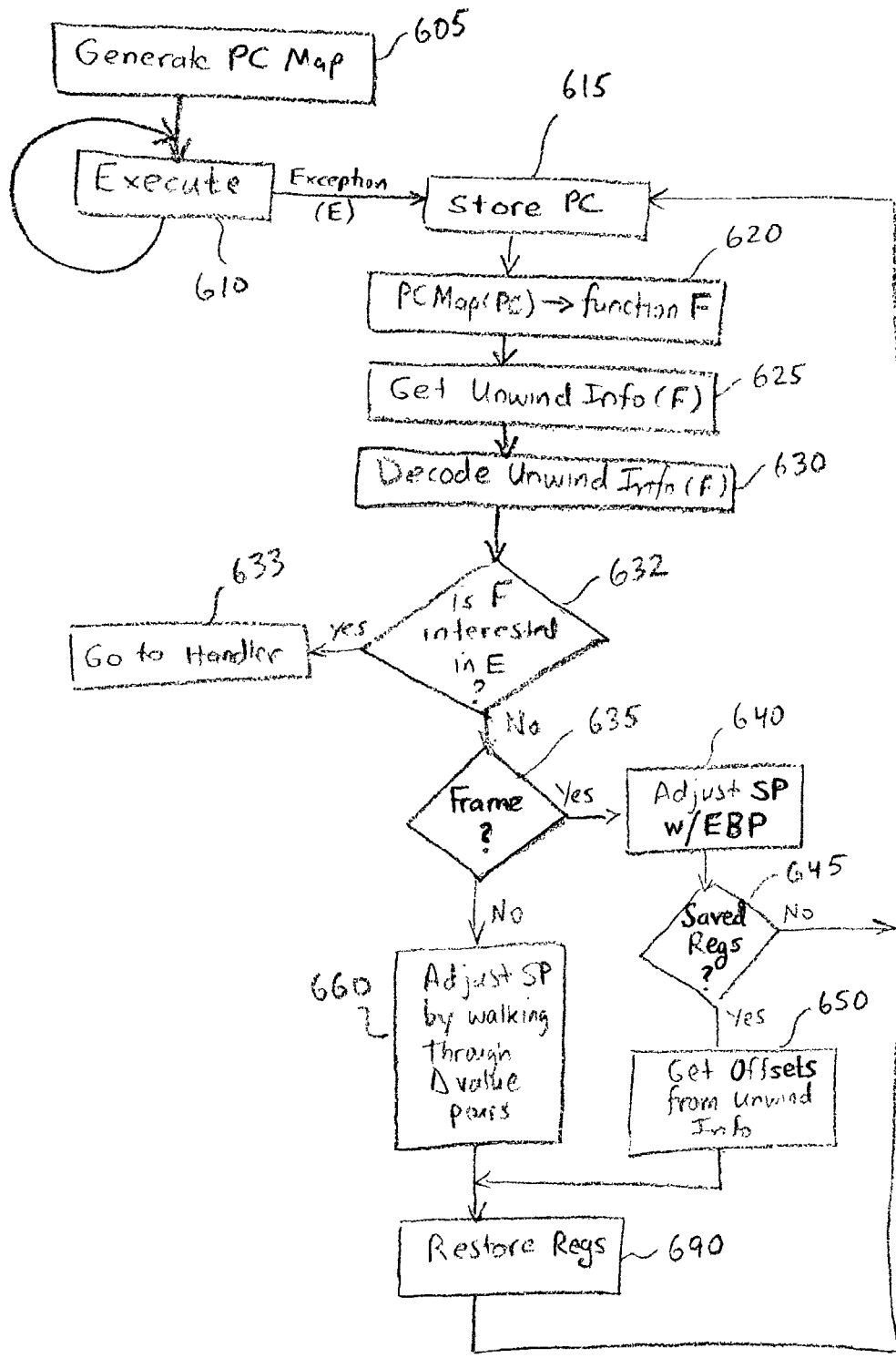
FIG. 6 shows a flow-chart of an exemplary method of unwinding an exception in accordance with the present invention.

In an exemplary embodiment of the present invention, an exception handling system and method based on a PC-mapped scheme are provided for Kylix. The exemplary scheme includes two levels of control, the first of which is preferably largely implementation-independent and the second of which is more specific to the Kylix implementation.

The basic flow of control in the unwinding process for an exception is as follows. The exception is raised to a runtime library (RTL). The RTL then does a two-phase walk up the function call stack. In the first phase (the "search" phase), the RTL searches for exception handlers interested in dealing with the exception. Once it finds a handler that is interested, the RTL enters the second phase of the walk (the "unwind" phase). The unwind phase informs any handlers between the current stack frame and the target handler stack frame that the system is unwinding and that they should thus perform whatever cleanup they deem necessary. The basics of this part of the unwinding mechanism can be factored out of practically all languages that support exception handling, and so are encapsulated in the first level of exception handling support.

The use of a language-independent library allows other languages to participate in exception handling seamlessly. Consider the case where two languages are being used in one program with one library being implemented in one language, and a second in another. If an exception is raised from one library it is desirable to clean-up all stack frames on the stack, even those built up by the other language. Without some abstract set of routines in between, the two languages cannot participate in the unwinding correctly, since much of unwinding is language-specific.

The second level is more specific to the particular implementation. For the most part, this includes specifics of the language semantics, e.g., what sort of cleanup needs to be done during the unwind phase, and how to interpret the exception itself. The library that handles all of the mechanics of the first level of control will be referred to as the "unwinder," and the second, language-dependent level will be referred to as the "RTL."

In the exemplary Kylix embodiment, the first level of control is based on the current C++ ABI specifications for IA-64, altered to deal with some issues specific to the IA-32 platform. Specifically, the current Intel IA-64 specifications cover both the linker-generated PC maps (including their locations) and the format of the stack unwind information generated by the compiler. There is no such industry-wide specification for the IA-32. Therefore, the semantics of the implementation were modified and several APIs were added to specify information about the linker-generated PC map. (See "C++ ABI for Itanium: Exception Handling," Jul. 31, 2001.)

To raise an exception, the language calls a routine in the unwind library, passing in a reference to an exception object of arbitrary, implementation-defined format: RaiseException (Exception). This routine implements the search and unwind phases of exception handling. It captures the current processor context (registers and the like), and uses the caller's address as a starting point to do the unwind. The caller's address is looked up in a global map of function address ranges created by the linker. Associated with this entry in the map is a personality routine specific to a language, implemented in the RTL: UnwindResultPersonality (Exception, Phase, Context). The unwind library calls this routine with the exception, the current phase (i.e., search or unwind), and the processor context. The personality routine is expected to return whether to continue the search, or to stop searching, unwind the stack, and execute a handler routine. (See "C++ ABI for Itanium: Exception Handling," Jul. 31, 2001.) In addition, the RTL is expected to update the processor context to contain values that reflect the state of the processor prior to the call of the function in question. The RTL has to unwind the current stack frame, as indicated by the processor context. This last part of the task requires the involvement of the compiler.

Crawling the stack under a PC-mapped system can be an involved procedure. The simple case, where a function has a formal stack frame is easy to handle. Burdening the system with stack frames, however, defeats the purpose of PC-mapping. The more difficult case arises when one or more of the activation records on the stack between where the exception was raised, and where it is to be caught, were built without using formal stack frames.

As mentioned, in the Intel x86 environment, formal stack frames are built using the frame pointer register EBP. EBP cannot be used for certain numerical operations and is generally used for making references to the stack. The common usage of EBP upon function entry is to push EBP on the stack and then set EBP to the current stack pointer, and then decrement from ESP (the stack pointer) to allocate a block of temporary stack space as scratch space for the function to write to. Using negative offsets from EBP gives access to this space. Using positive offsets from EBP allows access to some parameters that may have been pushed to the function. This provides an easy method for the compiler to make references to these data.

However, when the optimizer is allowed to fully optimize the code, the compiler will do whatever it can to improve the performance of the generated code. One optimization is to simply do away with using EBP to reference the stack in this case, and just use ESP. This usage is more complicated for the compiler to manage, and typically makes debugging harder, which is why it is only done when the optimizer is enabled.

In accordance with the present invention, for those cases in which activation records on the stack between where an exception was raised and where it is to be caught were built without using formal stack frames, in order for the RTL to unwind the frame in a timely manner, the compiler supplies certain information to assist in the unwinding. More specifically, the compiler provides information about how a given function modifies the stack throughout its execution, and where certain registers have been saved on the stack. Given an address within a function's code, the RTL must be able to determine what stack modifications have occurred up to that point in the execution of the function. The RTL uses this information so that it can reverse those modifications, and calculate a stack pointer value at which it can find the return address into the caller. Given that return address, the unwinder continues the process, crawling its way up the stack of callers. This process must not miss any function calls as doing so might miss routines whose handlers needed to be called. Neither can this process fail because of a lack of information.

FIG. 3(a) illustrates a simple function f and FIG. 3(b) shows pseudo code generated to carry out the function f. In this example, consider the occurrence of an exception during the execution of G. When the unwinder unwinds the stack, it finds a return address pointing to label1. The RTL is asked to unwind this frame, and needs to know that the push instruction (just before the call) modified the stack. The RTL thus takes the offset of label1 relative to the beginning of the function, and feeds it into the aforementioned unwind information generated by the compiler to determine how much the stack has been modified. When generating the unwind information, the compiler counts the number of bytes that have been pushed onto the stack by the assembler code of the function. In this example, the result will be 4 bytes because the assembler code of function f modified the stack pointer by 4 bytes (i.e., the push instruction pushed 4 bytes onto the stack). This amount is then added to the stack pointer in the context provided by the unwinder. The return address of function f is pulled off the stack at that location and set into the context as the next place the unwinder needs to go. It also modifies the stack pointer in the context by an additional 4 bytes for the size of the return address (assuming 32-bit addresses) then returns to the unwinder. At this point, the stack frame for the invocation of function f has been completely erased or "unwound."

Besides the information regarding the unwinding of the stack frame itself, the compiler also emits language-specific information about the frame. See FIG. 4. The compiler emits code ranges for the try clause, along with type information for the variable E. Type information is contained in a block of static data describing some details of a language-specific type. The compiler emits this information so that the RTL can decide that a given exception object is really of a particular type. In Object Pascal, every object that is created that is derived from the built-in type TObject has a pointer in it to the block of data that describes the type that object is.

During the unwinder's search phase, the RTL's personality routine looks up the current program counter in the function to see if it falls into the range of the try block. If so, then the function is interested in the exception, otherwise the search phase continues. During the unwind phase, once the unwinder has noted that this function wishes to handle the exception, the RTL's personality routine finds the offset of the code fragment in the function to which to transfer control when the unwinding of the stack has been completed. It is important that the unwind information, the language-specific information of code ranges, and the type information be position-independent. Under Linux, having pointers in this information is a significant liability, since relocations are applied at the load time of the image to the entire image. Because the size of the unwind information is generally proportional to the size of the generated code, this can introduce long startup times, as the application loader traverses and touches this data at startup time if it contains relocations.

The compiler handles all the unwind information for code that it generates for Object Pascal. The compiler also has the burden of dealing with assembler. Because Object Pascal supports inline assembler code and the Kylix RTL includes a significant amount of assembler code, the compiler must support the generation of unwind information for user-supplied assembly code. This is difficult to accomplish, and has its limitations.

Basically, the compiler looks at the instructions generated for a block of code and notes which ones modify the stack pointer and by how much. For a given offset into the function, it is necessary to determine by how much the stack pointer has been modified. As such, if it is necessary to unwind the entire stack frame, the offset can be used to determine the inverse change necessary to clean up the stack and get back to the instruction pointer that is the return address.

The aforementioned method, however, introduces some restrictions. First, the mechanism can only record static modifications to the stack. It does not track the case where modifications are made to the stack pointer based on runtime values that are passed into a function. For instance, if a parameter passed into a function is subtracted from the stack pointer register ESP to get a new stack pointer, it will not be possible to properly clean up the stack if there is no stack frame. Referring to FIG. 5, if G raises an exception, it will not be possible to unwind properly because there is no way to make a static determination of how much ESP was modified during the course of the execution of the function.

If, however, there is a stack frame, the above problem is avoided. In that case, the EBP register can be used to discard the stack frame and continue the unwind. The compiler automatically detects the presence of a standard form of stack frame in inline assembler code, and notes it, greatly reducing the size of the unwind information. Therefore, if the efficiency of the prologue of the function is not a concern and an inline assembly function might raise an exception, then it is advisable to put in a standard stack frame to limit the size of the unwind information. In particular, if it is necessary to violate any of these rules (where the stack is being modified dynamically in an inline assembler routine), a standard stack frame should be used.

In an exemplary embodiment, the unwinder and RTL are implemented separately. The unwinder is implemented in the C programming language and can be distributed in a first form in which it is bound statically into Delphi applications or in a shared form in which it is bound as a shared object. This can be the basis for a system-level unwind library, shared by all applications and languages. Standardization of the first level stack unwinder solves a number of interoperability issues present with other languages under Linux, and makes things easier for other language vendors in general. As discussed, the unwinder's search/unwind phases locate all of the information required to tear apart the stack frames laid down at the time an exception is raised. An aspect of the present invention is directed to the format of this information, and how it is used in these phases.

For each function, the compiler emits a highly conditionalized stream of data containing the unwind information for that function. The minimum size of unwind information for any given function frame is one byte, referred to as the unwind information header. As described more fully below, the header indicates whether there is additional unwind information following the header.

As discussed above, in the Intel x86 environment, some functions will have a formal stack frame generated with the following instruction sequence:

push EBP
    mov EBP, ESP

Such frames are easy to unwind. The difficult case arises for functions without a formal stack frame, namely, such as where EBP is used as a temporary register. Upon entry to the function, the compiler sets up the frame, then it saves the registers that it uses in the body of the function. In the Intel x86 environment, the registers of interest are EBX, ESI, EDI, and sometimes EBP. By most conventions on the Intel x86 architecture, the EBX, ESI, EDI and EBP registers are to be saved across a function invocation. Other registers can be used as scratch registers, and are not expected to be restored to their old values when the function returns. If any of these registers are saved, they must be restored when the function frame is unwound. It is therefore necessary to know where the contents of these registers are stored. The unwind information records this data.

In an exemplary embodiment, the format of the header byte of unwind information for a given function is as follows (where bit 0 is the least significant bit):

Bit 0: EBX register was saved
  Bit 1: ESI register was saved
  Bit 2: EDI register was saved
  Bit 3: EBP register was saved
  Bit 4: Function has a formal EBP frame
  Bit 5: Function is interested in the exception
  Bit 6: (Stack frame) Offset to the saved registers is recorded in the unwind information
  Bit 7: The function pops some bytes off the stack on return In the simplest case, bit 4 is set, there are no saved registers, and the function is not interested in the exception. The unwind information comprises only one byte (i.e., 0x10).

If bit 7 is set, the number of bytes popped by the function is stored, preferably in an arithmetically compressed form, immediately following the header byte. This number is used by the unwinder to adjust the stack pointer as it unwinds the stack frame. Ordinarily, the function itself would make this adjustment on return, so the unwinder takes this action in its stead.

If bit 6 is set, then an offset is recorded after the header using arithmetic compression. This offset is treated in one of two ways. First, if there is a formal EBP frame (bit 4=1), then the offset is an EBP-relative offset to the location of the saved registers. Preferably, all saved registers are stored by the compiler together in a predetermined order in which case the combination of the offset value and the flags in the header byte of which registers were saved is sufficient for restoring all callee-saved registers. If a formal EBP frame is not present (bit 4=0), then the offset is an offset relative to the beginning of the function in code bytes to the instruction which made the last modification to the stack before the registers were saved.

Following the above-described data, there may be a sequence of arithmetically compressed values for describing stack modifications made at various code offsets in the function. These values allow the unwinder to determine the adjustments that have been made to the stack pointer as a function of the program counter location within the function body. The unwinder needs this information if there is no formal stack frame, or if the frame is supposed to be partially unwound because there is a handler for this function that is interested in the exception. This information is arranged in pairs of arithmetically compressed delta values. As the instructions of a function are executed, some instructions modify the stack pointer and some do not. Starting from the beginning of the function, the changes in the stack pointer as execution progresses from instruction to instruction are statically determined and recorded by the compiler. Each pair of numbers thus recorded in the unwind information contains: 1) the delta value to the stack pointer, and 2) the delta value from the last instruction pointer offset that caused the stack pointer to change. Hence, given an offset into a function, the unwinder can start at the top of these pairs, and walking forward until it reaches the offset of the instruction pointer, accumulate what the total change to the stack pointer has been up to that point. This value can then be used to adjust the stack pointer to get to the next frame up on the stack, where the process can be repeated.

The use of a simple compression scheme, such as arithmetic compression, for storing the above-described numerical values can provide a significant reduction in the amount of storage required for the unwind information. In an exemplary embodiment, the number of bytes used to represent a multitude of numerical values can be reduced if the numerical values are frequently small. For example, consider a value which can range from 0x0000 to 0xffff, but which 99% of the time falls in the range of 0x0000 to 0x00ff. Always storing this value as 16 bits is wasteful since most of the time it can be encoded with 8 bits, or even less. In accordance with an exemplary algorithm, if a numerical value is less than 0x00ff, it is stored using one byte, i.e., 0xNN, where NN is the hexadecimal representation of the numerical value. If, however, the numerical value is greater than or equal to 0x00ff, but less than 0xffff, the value is stored as 0xNNNNff, where NNNN is the actual 16-bit value.

To decode numerical values that have been encoded in accordance with the above algorithm, if the first byte (i.e., the least significant byte) is smaller than 0xff, the first byte is treated as the actual value. If, however, the first byte is 0xff, the next 16 bits are treated as the actual value.

While values greater than or equal to 0x00ff will be encoded and stored using three bytes instead of two, values less than 0x00ff will be encoded and stored using only one byte instead of two. Where, as assumed, the vast majority of numerical values are less than 0x00ff, the net savings in size becomes significant for a large number of numerical values.

In an exemplary embodiment, the unwind information is located at the end of the function body in the code segment. In another exemplary embodiment, the PC map points to the unwind information for each function. This latter implementation uses an additional 4 bytes per function, but saves working set overall, because the unwind information is not in the middle of the code segment, taking up space. The Object Pascal compiler places the unwind information at the end of the function body. Thus, knowing where the function begins and ends (in the PC map) is sufficient to determine where the unwind information is located.

An exemplary embodiment of an unwind process will now be described with reference to the flow chart of FIG. 6.

At link time, a PC map is generated (605). Program execution (610) is then carried out until an exception occurs. The program counter (PC) at the point at which the exception occurs is stored (615). The PC value is then looked up in the PC map in order to determine the function (F) to which it belongs, and thus the function that threw the exception (620).

The unwind information for the function F is then obtained (625). The unwind information is then decoded, per the above-described format (630). If it is determined (632) that the function F is interested in the exception that was raised, the unwinder then transfers control to the handler code (633) specified by the function. If it is determined (632) that the function F is not interested in the exception, the unwinding continues. If it is then determined (635) that the function F has a formal stack frame (i.e., bit 4 of the unwind information is set), the value of EBP is used to adjust the stack pointer ESP (640). If it is determined (645) from the unwind information that there are saved registers (i.e., any one of bits 0–3 is set), the offsets given in the unwind information are obtained (650) and are used to restore the registers (690). Once the registers have been restored, the unwinding of the stack for the function (F) is complete and operation loops back (to 615) to continue the unwind procedure. If it is determined (645) that there are no saved registers, then nothing further need be done with respect to that function and operation loops back (to 615) to continue the unwind procedure.

If it is determined (635) from the unwind information that the function F does not have a formal stack frame, then a procedure (660) is carried out to modify the stack pointer (ESP) based on the delta pairs stored in the unwind information. The procedure (660) is described more fully below. As a result of this procedure (660), the stack pointer is adjusted to point to where the registers are saved. The saved registers are then restored (690) from that point in the stack to which the modified stack pointer is pointing. Once the registers are restored, operation loops back (to 615) to continue the unwind procedure.

Figure 7:
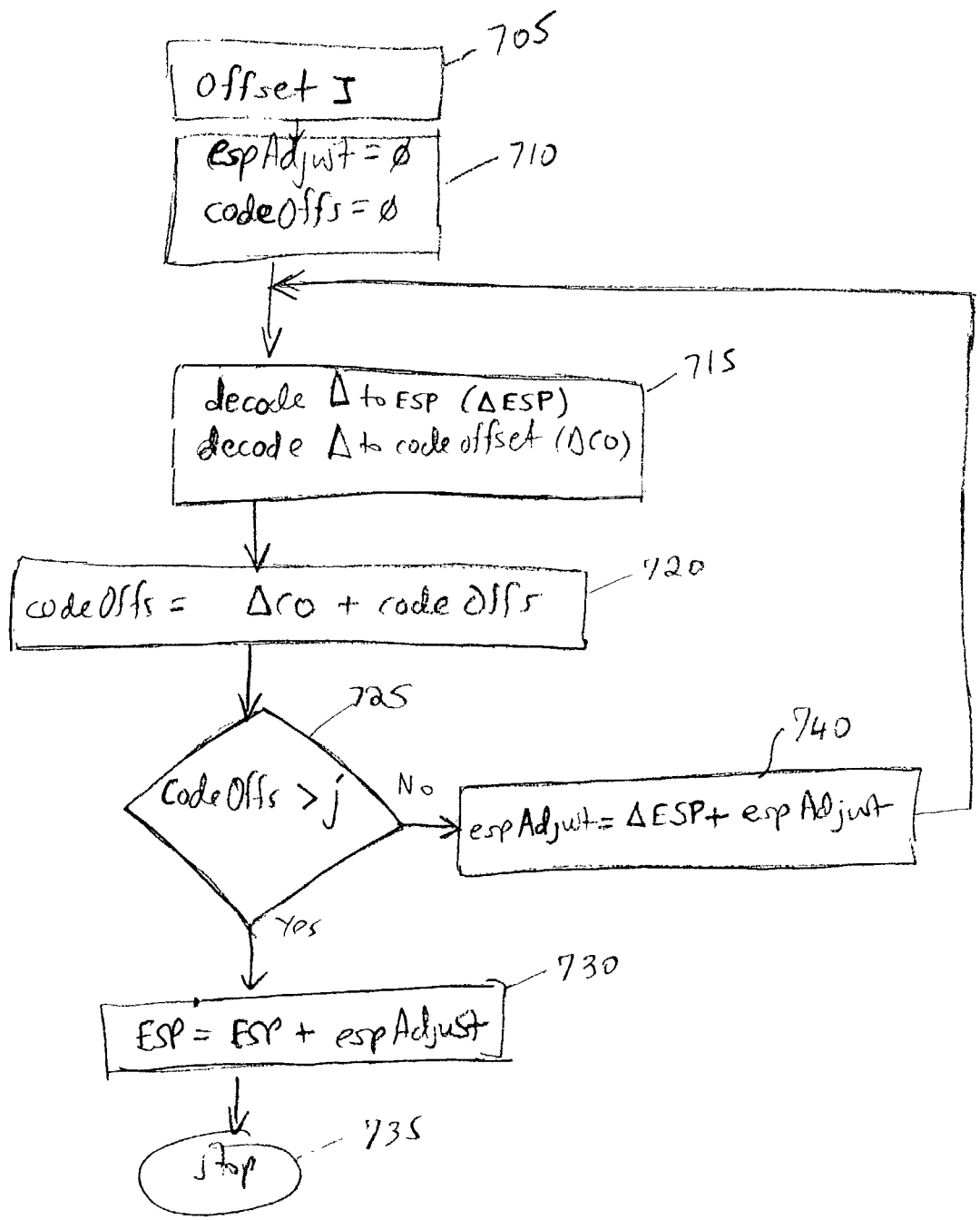
FIG. 7 shows a flow-chart of an exemplary method of determining a location for stored registers in accordance with the present invention.

Referring to FIG. 7, an exemplary embodiment of a method for adjusting the stack pointer (ESP) to point to where the register values are stored for a function lacking a formal stack frame will now be described. As mentioned above, this method uses "delta pairs" stored in the unwind information for said function. Each delta pair comprises an arithmetically encoded delta by which the stack pointer is to be modified, and a corresponding arithmetically encoded delta to the code offset within the function.

Starting at the top of the list of delta pairs, operation proceeds down the list until the offset from the beginning of the function matches the offset of the instruction pointer relative to the start of the function. More specifically, with reference to FIG. 7, given an offset j into the function of interest, the offset j indicating the point at which an exception was raised, the procedure starts at offset zero relative to the start of the function (705). Variables espAdjust and codeOffs are set to zero (710). Starting with the first pair of delta values, a pair of delta values are decoded (715). The delta code offset thus derived is added to codeOffs (720). If it is determined that codeOffs is greater than j (725), then espAdjust is added to the stack pointer value (730) and the delta pair walking procedure stops (735).

If, however, it is determined that codeOffs is not greater than j (725), then the delta stack pointer value decoded above (715) is added to espAdjust (740). Operation then loops back to process the next delta pair (715).

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

It is further to be understood that all values are to some degree approximate, and are provided for purposes of description.

The disclosures of any patents, patent applications, and publications that may be cited throughout this application are incorporated herein by reference in their entireties.

What is claimed is:

1. A method of handling an exception of an application and unwinding any stack frame in the application comprising the steps of:
   generating a map of function locations;
   generating unwind information for at least one function prior to execution of the application;
   capturing an exception location, the exception location being a location at which an exception occurs;
   determining an exception function by looking up the exception location in the map, the exception function being a function in which the exception occurred;
   obtaining unwind information for the exception function;
   decoding the unwind information to determine a location of register contents;
   obtaining the register contents; and
   restoring at least one register with the register contents.

2. The method of claim 1 wherein the unwind information includes a header, the header including at least one of the following:
   a flag for indicating whether a register has been saved;
   a flag for indicating whether the function has a formal stack frame;
   a flag for indicating whether the function is interested in the exception;
   a flag for indicating whether the unwind information includes location information for a saved register; and
   a flag for indicating whether the function pops any contents off of a stack upon return.

3. The method of claim 2, wherein the unwind information includes further information, the further information including at least one of the following:
   location information for the saved register; and
   a quantity of content popped-off of the stack upon return.

4. The method of claim 2, wherein the further information is encoded using arithmetic compression.

5. The method of claim 2, wherein the further information includes at least one stack pointer modification value and a corresponding code offset value.

* * * * *